United States Patent [19]
Lueking et al.

[11] Patent Number: 6,043,022
[45] Date of Patent: *Mar. 28, 2000

[54] APPARATUS AND METHOD FOR THE GENERATION AND USE OF FERRIC IONS

[75] Inventors: Donald R. Lueking, Houghton; Carl C. Nesbitt, Hancock, both of Mich.

[73] Assignee: Board of Control of Michigan Technological University, Houghton, Mich.

[*] Notice: This patent is subject to a terminal disclaimer.

[21] Appl. No.: 09/139,786

[22] Filed: Aug. 25, 1998

Related U.S. Application Data

[63] Continuation of application No. 08/651,676, May 21, 1996, Pat. No. 5,827,701.

[51] Int. Cl.⁷ .............................. C12Q 3/00; C12Q 1/02; C12P 39/00; C12P 3/00
[52] U.S. Cl. .................. 435/3; 435/29; 435/42; 435/168; 435/170; 435/252.1; 435/253.6; 435/289.1; 435/813
[58] Field of Search ............................ 435/42, 168, 170, 435/252.1, 289.1, 253.6, 813, 3, 29

[56] References Cited

U.S. PATENT DOCUMENTS

| | | | |
|---|---|---|---|
| 4,206,288 | 6/1980 | Detz et al. | 435/267 |
| 4,376,826 | 3/1983 | Mynatt | 435/253 |
| 4,740,243 | 4/1988 | Krebs-Yuill et al. | 75/101 |
| 4,869,905 | 9/1989 | Sobek et al. | 426/406 |
| 4,888,293 | 12/1989 | Hackl et al. | 435/245 |
| 4,931,262 | 6/1990 | Sonta et al. | 423/220 |
| 4,987,081 | 1/1991 | Hackl et al. | 435/262 |
| 5,006,320 | 4/1991 | Reid et al. | 423/150 |
| 5,127,942 | 7/1992 | Brierley et al. | 75/743 |
| 5,244,493 | 9/1993 | Brierley et al. | 75/743 |
| 5,246,486 | 9/1993 | Brierley et al. | 75/743 |
| 5,316,751 | 5/1994 | Kingsley et al. | 423/571 |
| 5,332,559 | 7/1994 | Brierley et al. | 423/27 |
| 5,338,338 | 8/1994 | Kohr | 75/711 |
| 5,364,453 | 11/1994 | Kohr | 75/711 |
| 5,443,621 | 8/1995 | Kohr | 75/711 |
| 5,462,720 | 10/1995 | Aragonés | 423/27 |

FOREIGN PATENT DOCUMENTS

| | | |
|---|---|---|
| 92 03117 | 10/1992 | South Africa . |
| WO 94 28184 | 12/1994 | WIPO . |

OTHER PUBLICATIONS

Chemical Abstracts 1982 96: 92408x.
Chemical Abstracts 1982 97: 35811v.
Chemical Abstracts 1982 97: 212339v.
Chemical Abstracts 1983 98: 214118s.
Chemical Abstracts 1984 100: 89293b.
Chemical Abstracts 1986 105: 9672q.
Chemical Abstracts 1987 106: 3822n.
Chemical Abstracts 1988 108: 190355p.
Chemical Abstracts 1989 110: 36592y.
Chemical Abstracts 1989 110: 36593z.
Chemical Abstracts 1989 110: 228388h.
Chemical Abstracts 1989 111: 191245b.
Chemical Abstracts 1990 113: 148646n.
Chemical Abstracts 1991 114: 203316c.
Chemical Abstracts 1991 115: 6975m.
Chemical Abstracts 1992 116: 212937z.
Chemical Abstracts 1992 117: 237538d.
Chemical Abstracts 1993 118: 25353k.
Chemical Abstracts 1993 118: 25358r.
Chemical Abstracts 1993 118: 74519c.
Chemical Abstracts 1993 118: 76783h.
Chemical Abstracts 1993 118: 172965q.
Chemical Abstracts 1993 119: 158351a.
Chemical Abstracts 1993 119: 221318n.
Chemical Abstracts 1993 119: 224419g.
Chemical Abstracts 1994 120: 276182q.
Chemical Abstracts 1994 121: 103672s.
Chemical Abstracts 1994 121: 129606y.
Chemical Abstracts 1994 121: 260246y.
Chemical Abstracts 1995 122: 54128d.
Chemical Abstracts 1995 122: 85952x.
Chemical Abstracts 1995 122: 319006w.
Chemical Abstracts 1995 123: 7904q.

Vancas, Mark F. and Cornejo, Ricardo, "MINBAC™ Technology Bio–oxidation Processes for Copper", Bateman Engineering, Inc., Copper Hydromet Roundtable '95.

Blake, Robert C. II, et al.; Enhanced Yields of Iron–Oxidizing Bacteria by In Situ Electrochemical Reduction of Soluble Iron in the Growth Medium; Applied and Environmental Microbiology, Aug. 1994, p. 2704–2710.

Barron, Jean Lacombe, et al.; Growth and Maintenance of *Thiobacillus ferrooxidans* Cells; Applied and Environmental Microbiology, Sep. 1990, p. 2801–2806.

Sikyta, Methods in Industrial Microbiology, Ellis Horwood Limited, Sussex, England, pp. 180, 181 and 193–197; 1983.

*Primary Examiner*—Herbert J. Lilling
*Attorney, Agent, or Firm*—Michael Best & Friedrich LLP

[57] ABSTRACT

An apparatus and method for the generation and use of ferric ions produced by acidophilic, chemoautotrophic bacteria.

63 Claims, 3 Drawing Sheets

APPARATUS AND METHOD FOR THE GENERATION AND USE OF FERRIC IONS

This patent application is a continuation of application Ser. No. 08/651,676, filed May 21, 1996 now U.S. Pat. No. 5,827,701.

FIELD OF THE INVENTION

The invention relates to an apparatus and method for the generation and use of ferric ions produced by acidophilic, chemoautotrophic bacteria.

BACKGROUND OF THE INVENTION

Naturally occurring bacteria are known to catalyze the dissolution of minerals. It is widely accepted that certain chemoautotrophic bacteria, such as *Thiobacillus ferrooxidans* among others, catalyze the oxidation of ferrous ion ($Fe^{+2}$) to the ferric ($Fe^{+3}$) state and sulfide ($S^=$ or $S^-$) to sulfate ($SO_4^=$), and utilize these low energy reactions for producing metabolic energy for growth. $Fe^{+3}$ is a chemically reactive ion which oxidizes many metal or sulphur bearing materials. In the process, the ferric ions are reduced to the $Fe^{+2}$ state and the sulfate reacts with water to lower the pH. In essence, these types of bacteria are able to generate a highly oxidative, acidic solution which is conducive to the dissolution of numerous materials such as those containing copper, iron, zinc, lead and mercury.

The leaching of materials such as ore using such chemoautotrophic organisms, a process termed bioleaching, has attracted much attention and interest in recent years due to increasing environmental awareness and decreasing ore grades. In some situations, it is no longer economically feasible to smelt low grade ores. Bioleaching is a more cost effective means of recovering metal from lower grade ores in that bioleaching is less energy consumptive and presents a lower environmental risk.

Some controversy exists as to how chemoautotrophic bacteria accomplish bioleaching. Current mining industry belief is that direct attachment of the bacteria to the ore is critical in leaching the ore. The bacterial adhesion is thought to be the initial step for oxidation. Most current bioleaching techniques involve the acidification of an inoculum of chemoautotrophic bacteria introduced to a pile of ore. Sulfuric acid and nutrients are then added to the ore to encourage the organism to oxidize the minerals below.

The problem with such current approaches to bioleaching is that toxins native to the ore will be solubilized during the oxidation process. Such toxins include arsenic, mercury, cadmium and other metals and metalloids. These metals and metalloids at low concentrations will destroy the bacteria resulting in significant down-time waiting to acclimate new bacteria to the ore pile. Further, the chemoautotrophic bacteria utilized in bioleaching are typically mesophilic and grow at temperatures between 25° C. and 40° C. Bioleaching reactions are exothermic in nature and, as a result, much heat is released so that the center of the ore pile may reach temperatures as high as 90° C. Accordingly, the bacterial oxidation activity can only occur in the cooler, top layer of the ore pile.

Pile bioleaching as well as other processes involving bioleaching, often present harsh conditions for optimal bacterial activity. Bioleaching has long been treated as a single unit process making optimization of the process a difficult task. Changes in the conditions within the pile found to be advantageous in conventional chemical leaching may adversely affect the activity of the organism in bioleaching.

Since their discovery, chemoautotrophic organisms useful in bioleaching were viewed by the mining industry as a promising and inexpensive means of oxidizing various components of crude ore. Although several large scale attempts have been made to enhance the growth of these organisms, little commercial success has been realized. Invariably as growth of the bacteria proceeds, the dissolution of toxins kill the organisms. In large scale operations, this leads to lost productivity as new bacteria must be reintroduced and established in the leach pile. In addition, bacterial activity drops considerably during the cold weather months. While bioleaching with chemoautotrophic bacteria has been known for many years, commercial applications have yet to be adopted as a viable industrial process due to the above problems.

Leaching can also be accomplished by allowing contact of the ferric ion solution, produced chemically, with the material to be treated. This process, however, has not proven commercially feasible due to the prohibitive cost of purchasing or chemically producing the ferric ion solution.

SUMMARY OF THE INVENTION

The invention described herein provides an apparatus and method for the production of ferric ions using chemoautotrophic bacteria. The chemoautotrophic bacteria are continuously maintained in a bioreactor through the control of system parameters such as pH and cell density so that a continuous output of ferric ions can be maintained indefinitely.

The produced ferric ions can be used in various applications such as leaching. For example, the ferric ions can be utilized in the dissolution of metal-bearing minerals for the purposes of metal recovery, in the pretreatment of precious metal-bearing ion to remove refractory minerals, or in a cleaning process for coal. In effect, the invention can be viewed as either a more cost efficient method by which to produce ferric ions for leaching applications as compared to chemical production of ferric ions or the invention can be viewed as separating the chemoautotrophic bacteria from the material to be treated when performing bioleaching.

With regard to the former, the invention provides for low cost production of ferric ions that can be used in traditional leaching applications. Through the use of chemoautotrophic bacteria that can be continuously maintained in a bioreactor to produce ferric ions, the cost of production of the ferric ions makes its use in commercial industrial application feasible.

With regard to the later view of the invention, and contrary to the view of the mining industry, it is the belief that the chemoautotrophic bacteria do not need to adhere to the material to be treated in order for the oxidation of that material to occur. Accordingly, by treating bioleaching as two operations, bacterial generation of ferric ions then leaching, each process can be optimized separately in order to improve recovery and economics. The organisms are used to oxidize a solution of ferrous iron in a controlled environment and then the resulting ferric ions are useable in applications such as leaching. The invention thereby allows for the elimination of the destruction of a majority of the bacterial population during the leaching application. By separating the majority of the bacterial population from the material to be treated, the bacterial population is not destroyed by contact with toxic metal ores. Any bacteria that may exit the bioreactor with the ferric ions may be destroyed due to contact with the material to be treated.

With either view of the invention, and in most applications of the ferric ion solution, the interaction of the ferric ions with the material to be treated results in the regeneration of ferrous ions that can be recycled to the bioreactor to serve as a continual source of energy for the growth of the chemoautotrophic bacteria. Any bacteria which exits the bioreactor and survives the subsequent application will also be recycled to the bioreactor.

It is an object of the present invention to provide a method for the generation of ferric ions.

It is another object of the present invention to provide an apparatus for the generation of ferric ions.

It is an another object of the present invention to provide a method for the generation of ferric ions using bacteria.

It is an another object of the present invention to provide a process for the continuous maintenance of a bacterial population which continuously produces ferric ions.

It is another object of the present invention to optimize the generation of ferric ions from chemoautotrophic bacteria.

It is another object of the present invention to maintain the health and viability of a bacterial culture through monitoring of parameters such as pH and cell density.

It is another object of the present invention to generate a ferric ion solution at a low cost.

It is another object of the present invention to generate a ferric ion solution for use in applications such as leaching.

It is another object of the present invention to provide a process for leaching of metal or sulfur bearing materials using ferric ions.

It is another object of the present invention to provide a bioleaching process that separates the bacteria from the material to be treated.

It is another object of the present invention to recycle ferrous ions that were generated during the use of ferric ions back to a bioreactor to be used as a feed solution for a bacterial population to produce more ferric ions.

It is another object of the present invention to provide a process to gradually introduce a recycled ferrous solution to bacteria to acclimate the bacteria to higher levels of chemicals known to be toxic to the bacteria.

Other features and advantages of the invention will become apparent to those of ordinary skill in the art upon review of the following detailed description, claims, and drawings.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Figure 1:
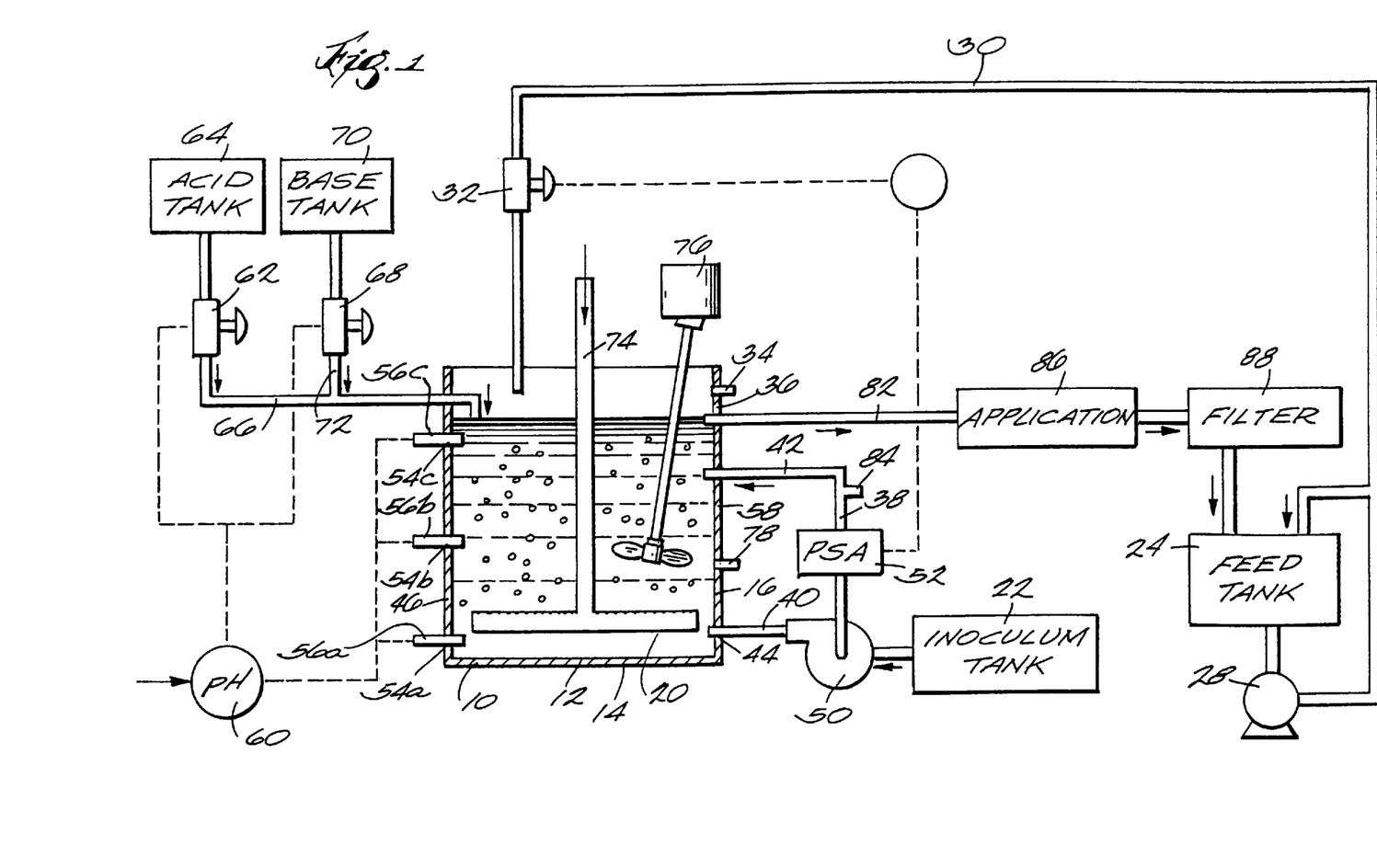
FIG. 1 is a schematic of the continuous ferric ion generation system embodying the invention.

Referring now to the drawings, an apparatus and method for the continuous generation of ferric ions and its use and for the continuous maintenance of a bacterial population to produce the ferric ions is shown in FIG. 1. The system includes a bioreactor 10 which is utilized to produce ferric ions. The bioreactor 10 employs bacteria to generate the ferric ion solution from a feed solution containing ferrous ions.

Figure 2:
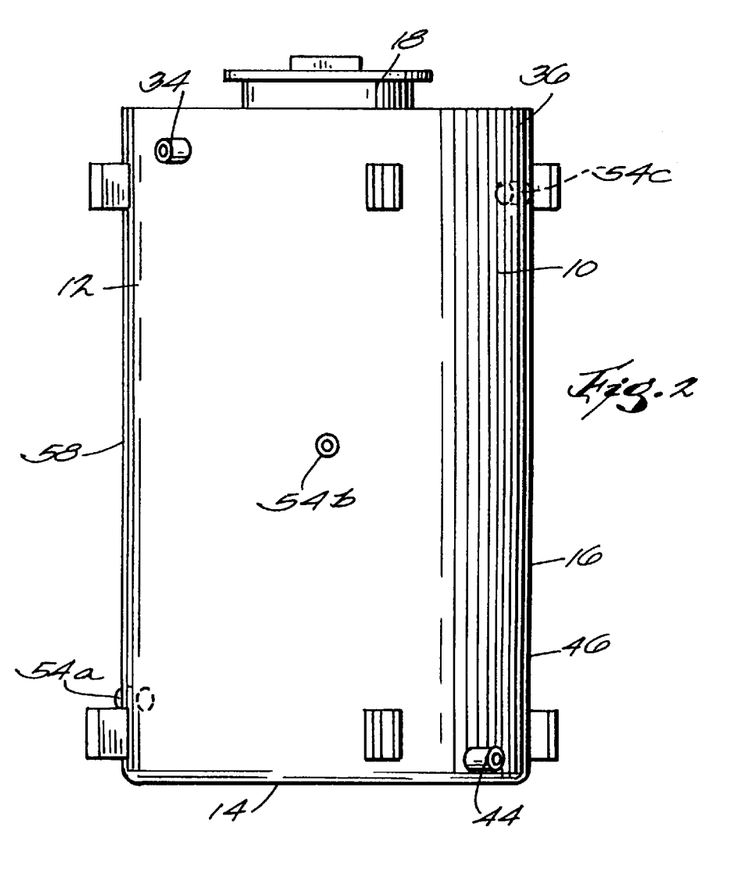
FIG. 2 is an elevational view of a bioreactor.
Figure 3:
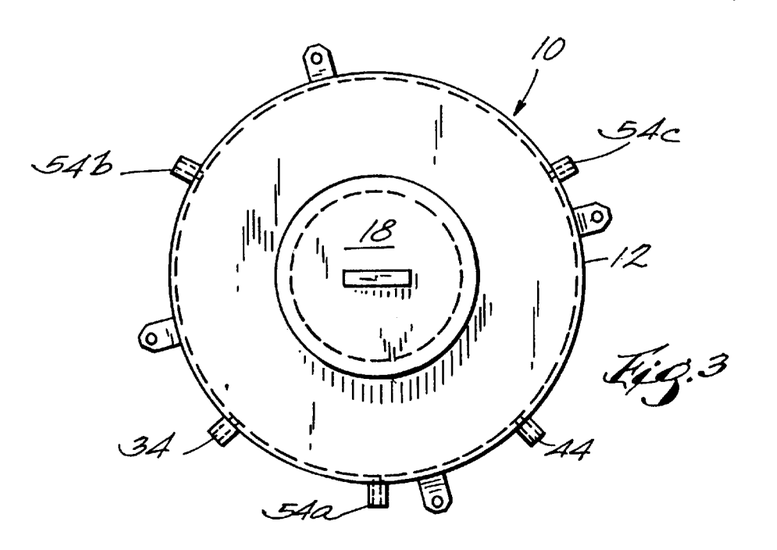
FIG. 3 is a sectional view of the bioreactor.

As shown in FIGS. 1–3, the bioreactor 10 includes a vessel or tank 12. In one embodiment, the tank 12 has a flat bottom 14, an annular side wall 16 and a flat removable top 18 which is preferably removed during operation of the bioreactor 10. It should be noted that other configurations of the tank 12 can be used in practicing the invention.

The tank 12 should be constructed of materials which are resistant to corrosion such as by ferric sulfate and sulfuric acid. Further, the tank should not contain any materials which may be toxic to the bacterial population. Preferably, the bioreactor 10 is constructed of fiberglass reinforced plastic and is a premium grade Derakane® 411-45 vinyl ester resin in a corrosion barrier, an isophthalic polyester resin in a structural layer and a single C-glass veil in the corrosion barrier. The bioreactor 10 can be of varying volumetric capacities such as, for example, 1 liter, 40 liters, 4000 liters, or 40,000 liters depending upon the volume of the ferric ion solution required for a particular application.

An example of the tank 12 is model number C-CFV-4-590 manufactured by Belding Tank Technologies, Inc. of Belding, Mich. which has a volume capacity of 2400 liters. The flat top 18 is preferably 0.250" thick with a 0.010" single C-glass veil in an inner layer, a 0.100" corrosion barrier, and a 0.140" structural layer. The side wall 16 is preferably 0.250" thick at the top portion of the side wall 16 with a 0.010" single C-glass veil in an inner layer, a 0.100" corrosion barrier, and a 0.140" structural layer. The bottom portion of the side wall 16 is preferably 0.500" thick. The flat top 18 of the tank 12 is preferably 0.250" thick with a 0.010" single C-glass veil in an inner layer, a 0.100" corrosion barrier, and a 0.140" structural layer.

The tank 12 defines an interior chamber 20 for housing the bacterial population. Preferably, the bacteria used to generate the ferric ions are of the genus Thiobacillus, and more preferably are of the *Thiobacillus ferrooxidans* species such as strain ATCC 19859 deposited with the American Type Culture Collection. The invention will hereafter be described in operation with the bacteria of the species *Thiobacillus ferrooxidans*. However, it should be noted that bacteria that are acidophilic, chemoautotrophic and utilize ferrous iron as an oxidizable energy source can be utilized with this invention. Examples of other organisms, which are not intended to be limiting, that meet the above criteria include *Leptosprillum ferrooxidans,* organisms of the genus Sulfolobus such as *Sulfolobus acidocaldarius,* and *Sulfobacillus thermsulfidooxidans. Thiobacillus ferrooxidans* is a chemoautotrophic, obligate, mesophilic aerobe which is approximately 1 $\mu$m in length, rod-shaped and mobile. *Thiobacillus ferrooxidans* derive energy from the oxidation of ferrous iron ($Fe^{2+}$) in the presence of oxygen at pH values between 1.5 and 5.0, with the optimum pH reported to be below 2.2. *Thiobacillus ferrooxidans* utilizes carbon dioxide as its sole source of carbon for growth. As a result of the oxidation of ferrous iron at low pH values, a highly oxidizing solution containing ferric ions is produced which is useable as a leachant for metal or sulfur bearing materials.

A population of *Thiobacillus ferrooxidans* can be prepared as follows. *Thiobacillus ferrooxidans* is grown and maintained as described in LaCombe-Barron and Lueking, *Growth and Maintenance of Thiobacillus ferrooxidans*

*Cells*, Appl. and Environ. Microbiol., 56:2801–2806 (1990), which is incorporated by reference herein. The organism is grown chemoautotrophically on ferrous sulfate based minimal medium containing 12 grams of ferrous iron per liter. Sterile media is prepared employing two solutions, a ferrous sulfate solution and a basal salts solution. The ferrous sulfate solution cannot be sterilized by autoclaving because the ferrous iron present degrades under high temperature and pressure. Therefore, the two solutions are prepared separately and combined following sterilization.

The ferrous sulfate solution is prepared by dissolving 59.7 grams of ferrous sulfate heptahydrate in 520 ml of distilled water. 10N sulfuric acid is added to the solution in order to obtain a pH of 1.90. The solution is filter sterilized using a 0.45 μm nitrocellulose or acetate filter and a Millipore® filter apparatus.

The basal salts solution is prepared by dissolving 3.5 grams ammonium sulfate, 0.058 grams potassium phosphate dibasic, 0.116 grams potassium chloride, 0.058 grams magnesium sulfate heptahydrate and 0.00168 grams calcium nitrate in 420 ml of distilled water. The pH of the solution is adjusted to 1.90 by the addition of 10N sulfuric acid.

*Thiobacillus ferrooxidans* is grown in 18×150 mm culture tubes or in 500 ml serum bottles containing 10 ml and 300 ml volumes of ferrous sulfate minimal medium respectfully. A population of the *Thiobacillus ferrooxidans* is then transferred to and grown in an inoculum tank 22, which is smaller in volume than the bioreactor 10, before being transferred to the bioreactor 10. Preferably, a series of inoculum tanks 22 are employed using a 10% pre-inoculum level before the bacteria are transferred to the bioreactor 10. For example, if a 4000 liter bioreactor is employed, the bacteria would be maintained in a 40 liter inoculum tank, then transferred to a 400 liter inoculum tank and then transferred to the 4000 liter bioreactor. Typically, the bacteria are maintained in each inoculum tank for a period of one to three days before transfer to the next inoculum tank or the bioreactor 10. At start-up of the bioreactor 10, a culture of the bacteria must be transferred to the bioreactor 10 and allowed to grow before the continuous production of ferric ions can begin. Typically, this period is one to three days.

It should be noted that in addition to growth in liquid medium, growth of the bacteria can also be carried out on solidified medium as described in Yates and Homes, *Two Families of Repeated DNA Sequences in Thiobacillus ferrooxidans,* Journal of Bacteriology, 169:1861–1870 (1987).

The invention not only enables ferric ions to be produced from acidophilic, chemoautotrophic bacteria but also enables the bacteria to be continuously maintained in the bioreactor 10 to provide a low cost continual source of the ferric ions. To be so maintained, the bacteria require a source of metabolic energy which is supplied in the form of a feed solution. The feed solution is preferably a ferrous sulfate growth medium containing ferrous sulfate in an aqueous solution maintained at a pH of about 1.5–2.0 with sulfuric acid. The ferrous iron concentration of the feed solution has an effect on the growth rate of the organisms. The ferrous iron concentration of the feed solution varies depending upon the requirements of the subsequent use of the ferric ions. Typically, ferrous ion concentration is within the range of 1 g/l to 15 g/l.

The feed solution is stored in a feed tank 24 and supplied to the interior chamber 20 of the bioreactor 10 from the top of the tank 12 via a pump 28 and an influent conduit 30. Preferably, the feed tank 24 is constructed of a polypropylene material, the pump 28 is constructed with a corrosion resistant magnetic drive, and the conduit 30 is constructed of a polyvinyl chloride material. A control valve 32 is positioned along the conduit 30.

The tank 12 includes an overflow port 34 located near the top portion 36 of the side wall 16. The port 34 maintains a constant solution level in the tank 12 by allowing any solution overflow to exit the tank 12 via the port 34.

The bioreactor 10 also includes a recirculation conduit 38 having first and second ends 40 and 42 respectively. The first end 40 is in communication with the interior chamber 20 of the tank 12 through a port 44 in a lower portion 46 of the side wall 16. The second end 42 of the recirculation conduit 38 is in communication with the interior chamber 20 through a port 48 in the top portion 36 of the side wall 16. A pump 50 is connected to the recirculation conduit 38 to perform the recirculation of the contents in the bioreactor 10 in the direction of the arrow (FIG. 1). The port 48 also enables the tank 12 to be drained for cleaning, maintenance, etc.

Addition of the feed solution to the bioreactor 10 is controlled by monitoring the bacterial population cell density. Cell density is a parameter that can be monitored and controlled to optimize the production of ferric ions. Preferably, cell density is maintained in the range of approximately $5\times10^8$ cells/ml ($OD_{500}$=0.100) to $1\times10^9$ cells/ml ($OD_{500}$=0.200).

To monitor cell density, a Lasentec™ particle size analyzer (PSA) 52 is employed. The PSA 52 is preferably placed along the recirculation conduit 38 and is operatively connected to the control valve 32. When the PSA 52 determines the bacterial cell density in the bioreactor 10 is too high, the PSA 52 sends a signal to the control valve 32 and the control valve 32 opens allowing feed solution to enter the bioreactor 10 via the conduit 30. When the PSA 52 determines cell density is too low, the PSA 52 sends a signal to the control valve 32 and the control valve 32 closes thus shutting off the supply of feed solution to the bioreactor 10. When the control valve 32 is closed, the pump 50 recirculates the contents in the tank 12 through the conduit 38. Alternately, the PSA 52 can be placed in the interior chamber 20 of the tank 12 to monitor cell density.

To maintain a continuous growth of the bacterial population in the bioreactor 10, control of pH is required. Preferably, the pH is maintained in the range of 1.5–2.0, and more preferably, in the range of 1.7 to 1.9. pH control is also necessary to keep the iron in a soluble form. To maintain pH control, the tank 12 preferably has three ports 54 in the side wall 16 capable of supporting pH probes 56. One probe 56a is located in port 54a in the lower portion 46 of the side wall 16, one probe 56b is located in port 54b in a middle portion 58 of the side wall 16 and one probe 56c is located in port 54c in the top portion 36 of the side wall 16. The pH probes 56 are preferably specially designed for fermentors such as the pH probes manufactured by Omega of Stamford, Conn. as model number Omega® PHE-6820.

The pH probes 56 are in communication with a controller 60 such as a suitably programmed microprocessor. When the pH in the interior chamber 20 of the tank 12 is above a set range, such as the range 1.5–2.0, the controller 60 activates a control valve 62 that is in communication with an acid supply tank 64 containing an acid such as 10N sulfuric acid. The choice of acid may depend upon the requirements of the subsequent application of the generated ferric ion solution. The acid enters the interior chamber 20 of the tank 12 via a conduit 66 to lower the pH of the solution in the tank 12. When the pH is lowered enough to fall within the set range, the controller 60 sends a signal to close the control valve 62.

If the pH level in the tank 12 is too acidic and outside the set range, the controller 60 activates a control valve 68 that is in communication with a base supply tank 70. The choice of base may depend upon the requirements of the subsequent application of the generated ferric ion solution. For example, ammonium hydroxide can be used. The base enters the interior chamber 20 of the tank 12 via a conduits 72 and 66 to raise the pH of the solution in the tank 12. When the pH is raised to fall within the set range, the controller 60 sends a signal to close the control valve 68.

To facilitate growth of the bacterial population, tank agitation is performed. The agitation is accomplished through recirculation of tank solution from the bottom of the interior chamber 20 to the top through the recirculation conduit 38 as discussed above. Tank agitation is also accomplished by sparging, for example, a 7.5% carbon dioxide/92.5% air mixture through a sparging tube 74. Optionally, a mechanical mixer 76 such as an impeller rotating at 200–800 rpm can be utilized to add further agitation. The dissolved oxygen of the solution in the bioreactor 10 is monitored using a probe 78 such as a dissolved oxygen probe manufactured by Phoenix Electrode Company of Houston, Tex. The sparging tube 74 supplies the bacteria with a source of oxygen and carbon dioxide. The carbon dioxide can be generated by acidification of calcium carbonate and introduced into the tank 12 at preferably a 7.5% by volume mixture with the compressed air.

Temperature in the bioreactor 10 can also be controlled if necessary. The temperature can be conventionally maintained by circulation of water through a heating and cooling jacket (not shown) which surrounds the tank 12. Preferably, the temperature of the solution in the tank 12 is maintained in the range of 25–40° C.

After the start-up population of *Thiobacillus ferrooxidans* is placed in the interior chamber 20 of the bioreactor 10, the bacteria are allowed to grow without the addition of feed solution until an increase in the cell density is detected by the PSA 52. Thereafter, the feed solution is added to the bioreactor 10 and the system parameters are measured and monitored to keep them in their respective optimal ranges.

The ferric ion solution produced in the bioreactor 10 exits the tank 12 via an effluent line 82. A small amount of the bacteria also exit the bioreactor 10 with the ferric ion solution. The bacteria exiting the bioreactor 10 do not affect the continuous maintenance of the bacteria that remain in the bioreactor 10.

To monitor and control the relative amount of ferric ions produced, an oxidation-reduction potential (ORP) probe 84 is used such as a digital pH/millivolt meter 611 available from Orion Research of Boston, Mass. The ORP probe 84 is positioned along the recirculation conduit 38. Preferably, the ORP value of the solution in the bioreactor 10 is maintained at less than 520 mV to prevent the formation of precipitate, and most preferably, is maintained at less than 450 mV.

All conduits used are autoclavable and are Masterflex silicone tubing. Preferably, the conduits 66 and 72 are Masterflex 6409-14 tubing and the conduits 30 and 38 are Masterflex 6411-16 tubing.

Monitoring of some or all of the bioreactor parameters can be accomplished using a microprocessor controller such as that manufactured by Omega as model number Omega® PHCN-37. Alternatively, some or all of the bioreactor parameters can be monitored and maintained with Advanced Fermentation Software (AFS) available from New Brunswick Scientific Co., Inc. of Edison, N.J.

As shown in FIG. 1, the ferric ion solution produced exits the bioreactor 10 via the effluent line 82 and can thereafter be used in an application 86 such as that requiring the treatment of metal or sulfur bearing material. With the use of a 2400 liter tank, approximately 4800 liters of ferric ion solution can be generated every 24 hours.

In some applications, the interaction of the ferric ion solution with the material to be treated results in the regeneration of ferrous ions that can be recycled to the bioreactor 10 to serve as a continual or closed loop source of energy for the growth of the organisms in the bioreactor 10. Material toxic to the bacteria such as chloride ions needs to be removed from the solution before introduction into the bioreactor 10. Further, the concentration of ferrous ions needs to be adjusted to eliminate the effect which varying concentrations of ferrous ions could have on the growth of the bacteria in the bioreactor 10. A filter 88 is also employed to ensure that no particulates enter the bioreactor 10.

Specifically, when the converted ferrous solution is to be recycled back through the bioreactor 10, the organisms can be and preferably are slowly adapted to the recycled solution which contains increased levels of toxic contaminants. A gradual and systematic exposure of the bacteria in the bioreactor 10 to the components of the recycled solution is a desirable acclimatization procedure. For example, with the gradual introduction of the recycled ferrous solution, it is possible to achieve approximately 90% replacement of the original feed solution with the recycled ferrous ion solution, with a resulting reduced bacterial growth rate of approximately fifty percent. Accordingly, by slowly adapting the organisms to the recycled ferrous solution, growth of the organism does continue in the environment of increased toxins. The ability to acclimate the organisms to the recycled solution further decreases the cost of production of the ferric ion solution making the invention even more cost effective.

With respect to the leaching applications for the ferric ion solution, it is the belief that direct attachment of the bacteria to the material to be treated is not necessary and is not the main mechanism by which such bacteria are able to oxidize material. The role of the chemoautotrophic bacteria are to produce the ferric ions that can be subsequently used in leaching. Accordingly, the ferric ions generated by the bioreactor 10 create a constant supply of leachant for a wide variety of applications.

Figure 4:
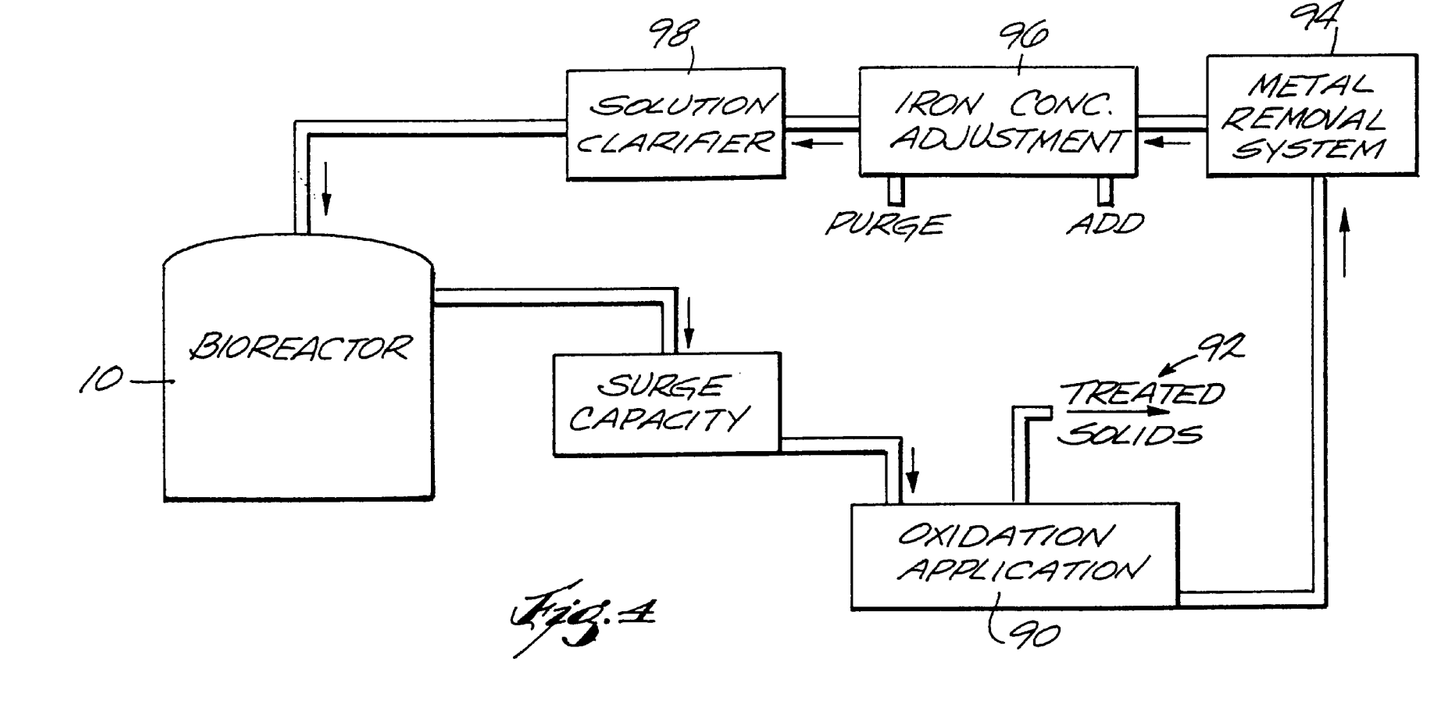
FIG. 4 is a schematic depicting the use of the bioreactor embodying the invention.

Referring now to FIG. 4, a typical integrated system for producing and utilizing ferric ions is shown. The bioreactor 10 containing bacteria continuously produces ferric ion solution that is then used in an oxidation application 90. It should be noted that several bioreactors 10 can be used in parallel to supply the necessary amount of ferric ion solution for a particular application.

In general, the ferric ion effluent produced by the bioreactor 10 can be used in the two types of leaching processes: percolation leaching and agitation leaching. In percolation leaching, the ores, concentrates or scrap metals are stacked on an impermeable pad or rubbilized in place. The ferric ion solution is then applied to the solids by gravity percolation or pumped through the material. The leach liquor is collected at the bottom of the heap. In agitation leaching, the ferric ion solution is mixed with finely ground solids to form a slurry. The solids and liquid phases are then separated using any conventional solid/liquid separation technique.

Both leaching applications generate two products; a treated solid 92 (leached material) and a liquid which is rich in metal (preg solution). The solids may be disposed (as in the case of recovering primary metals from a solid), set aside for further processing (as in the pretreatment of precious metal ores) or sold (as in the case of cleaning coal). The solution may be stripped of the metal value using cementation on scrap iron or steel wool, chemical precipitation as a sulfide or hydroxide precipitate, electrowinning to plate a specific metal or treated by other methods specific to recovering non-ferrous metals in solution denoted as 94 in FIG. 4. The stripped solution will contain primarily ferrous ions. Optionally, an on-line atomic absorption or spectrophotometry 96 can be used to automate the dilution or addition of ferrous ion to maintain a steady iron concentration in the system and a solution clarifier 98 can also be employed. As described above, the preg solution can be returned to the bioreactor 10 for regeneration of ferric ion solution to continue the cycle.

Three examples of the types of oxidation applications that utilize ferric ions are set forth below. Many additional applications are not listed and the examples set forth hereinafter are not intended to be limiting to the potential uses of the bioreactor 10 and the ferric ions produced therein.

A. Oxidation of primary metal from an ore or scrap. The ferric ion solution produced by the bioreactor 10 is of a sufficient strength to directly leach the metallic, sulfidic and oxidic forms of copper, zinc, lead, iron, mercury, nickel, arsenic, cadmium, cobalt, antimony, bismuth, silver, tin, etc. from metal scrap or naturally occurring minerals. These metals are soluble in ferric ion solution and may be recovered from the solution using any of several conventional techniques.

B. Pretreatment step to enhance recovery of precious metals. The minerals described above may be associated with precious metal ores. These minerals are detrimental to the recovery of precious metals and must be oxidized or removed prior to conventional processing. The ferric ions produced by the bioreactor 10 can be used in an oxidative pretreatment process of this purpose.

As exploration increased in the past few decades, many low grade gold deposits have been discovered which contain significant amounts of sulfide minerals. These minerals hinder the recovery of gold by direct cyanidation and must be removed in a pretreatment oxidation process. The ferric ion effluent produced by the bioreactor 10 can be used to directly oxidize these minerals prior to cyanidation as follows. The gold-bearing ore containing sulfidic minerals is crushed and placed on an impermeable pad. The ferric ions generated in the bioreactor 10 or several bioreactors are applied to the crushed ore to oxidize the sulfide minerals. After the oxidation is complete in several days, the heap is rinsed with a high pH solution followed by cyanide solutions which dissolves the precious metal. Such a process can increase gold recovery from 5–7% in untreated ores to as high as 50% in treated ores. If the preg solution in the oxidation step is to be recycled to the bioreactor(s) 10, the solution should be treated to minimize or eliminate the toxic components prior to entry into the bioreactor 10. Secondary metal recovery could also be realized by stripping the metals from the solution prior to recycle to the bioreactor 10.

The result is an enhanced recovery of gold from ores previously considered too refractory to treat at a low cost. The process is applicable in the pretreatment of refractory carbonaceous ores as well.

C. Removal of gangue or hazardous compounds to increase the value of products. Eastern United States coal is characterized as containing higher concentrations of sulfur due to large amounts of pyrite which contribute to the coal's high sulfur content. By removing the pyrite through oxidation with ferric ions, the coal is more useful to large coal consumers, such as power plants, metal-producers, etc. In essence, the use of ferric ions eliminates the production of sulfur dioxide through aqueous processing of the coal.

Conversely, western United States coal typically contains higher amounts of mercury-bearing minerals. Ferric ions can treat the elemental mercury and/or mercuric sulfide, either of which may be present in this coal.

By continuously growing chemoautotrophic bacteria in a controlled environment such as the bioreactor 10, several advantages are gained. Some of the more important advantages include, but are not limited to, the following. First, the ferric ion effluent from the bioreactor 10 will contain some bacteria which are flushed with the solution. These bacteria may continue to thrive within the material being leached, possibly enhancing the oxidation process. However, even if these cells do not survive, the oxidation process will continue based on the continuous source of ferric ions from the bioreactor 10.

Second, the generation of ferric ions can be optimized through the careful control of the conditions in the bioreactor 10. Third, the health and viability of the bacteria in the bioreactor 10 is maintained through monitoring of system parameters. Fourth, automation of the bioreactor 10 keeps the cost of operation and production of ferric ions minimal. Fifth, the preg solution can be treated and returned to the bioreactor to assure a steady supply of ferrous ions to maintain the bacteria in the bioreactor 10.

We claim:

1. A method for oxidizing metal or ore comprising the steps:

supplying a vessel housing acidophilic, chemoautotrophic bacteria which oxidize ferrous ions into ferric ions;

supplying a feed solution including ferrous ions to the vessel;

maintaining the pH of the contents of the vessel in a predetermined range so that the bacteria generate ferric ions;

monitoring the cell density of the population of bacteria in the vessel;

maintaining the cell density of the population in a predetermined range whereby ferric ions can be continually generated by the population;

withdrawing the generated ferric ions from the vessel; and oxidizing the metal or ore with the withdrawn ferric ions.

2. The method of claim 1 wherein the acidophilic, chemoautotrophic bacteria include at least one of *Leptospirillum ferrooxidans, Sulfolobus acidocaldarius, Sulfobacillus thermosulfidooxidans* and *Thiobacillus ferrooxidans*.

3. The method of claim 1 wherein the bacteria are *Thiobacillus ferrooxidans*.

4. The method of claim 1 wherein the feed solution includes ferrous sulfate in an aqueous solution.

5. The method of claim 1 wherein ferrous ions are regenerated during the oxidation of the metal or ore and further including the step of returning the regenerated ferrous ions to the vessel.

6. The method of claim 5 wherein the regenerated ferrous ions are returned to the vessel in the feed solution.

7. The method of claim 1 wherein the pH is maintained under 3.5.

8. The method of claim 1 and further including the step of monitoring the pH of the contents of the vessel with a pH probe.

9. The method of claim 1 wherein the cell density is monitored using a particle size analyzer.

10. The method of claim 1 wherein the cell density is maintained in the predetermined range by controlling the supply of feed solution to the vessel.

11. A method for solubilizing metal from ore, alloys or scrap comprising the steps:
supplying a vessel housing acidophilic, chemoautotrophic bacteria which oxidize ferrous ions into ferric ions;
supplying a feed solution containing ferrous ions to the vessel so that the bacteria generate ferric ions;
monitoring the pH of the contents of the vessel;
maintaining the pH of the contents of the vessel in a predetermined range such that the bacteria generate ferric ions;
monitoring the cell density of the population of bacteria in the vessel;
maintaining the cell density of the population in an predetermined range so that the population continually produces ferric ions;
withdrawing the generated ferric ions from the vessel; and
solubilizing the metal from ore, alloys or scrap with the generated ferric ions.

12. The method of claim 11 wherein the acidophilic, chemoautotrophic bacteria include at least one of *Leptospirillum ferrooxidans, Sulfolobus acidocaldarius, Sulfobacillus thermosulfidooxidans* and *Thiobacillus ferrooxidans*.

13. The method of claim 11 wherein the bacteria are *Thiobacillus ferrooxidans*.

14. The method for of claim 11 wherein the feed solution includes ferrous sulfate in an aqueous solution.

15. The method of claim 11 wherein ferrous ions are regenerated during the solubilizing step and further including the step of returning the regenerated ferrous ions to the vessel.

16. The method of claim 15 wherein the regenerated ferrous ions are returned to the vessel in the feed solution.

17. The method of claim 11 wherein the pH is maintained under 3.5 through the addition of acid and base as necessary.

18. The method of claim 11 and further including the step of monitoring the pH of the contents of the vessel with a pH probe.

19. The method of claim 11 wherein the cell density is monitored using a particle size analyzer.

20. The method of claim 11 wherein the cell density is maintained in the predetermined range by controlling the supply of feed solution to the vessel.

21. A method for continuously generating ferric ions comprising the steps:
establishing a population of acidophilic, chemoautotrophic bacteria which oxidize ferrous ions into ferric ions in a vessel;
supplying a feed solution to the vessel wherein the feed solution contains ferrous ions;
monitoring the pH of the contents of the vessel and maintaining the pH of the contents of the vessel in a predetermined range so that the bacteria generate ferric ions;
withdrawing the generated ferric ions from the vessel; and
monitoring the cell density of the population and maintaining the cell density in a predetermined range whereby additional ferric ions can be generated.

22. The method of claim 21 wherein the acidophilic, chemoautotrophic bacteria include at least one of *Leptospirillum ferrooxidans, Sulfolobus acidocaldarius, Sulfobacillus thermosulfidooxidans* and *Thiobacillus ferrooxidans*.

23. The method of claim 21 wherein the bacteria are *Thiobacillus ferrooxidans*.

24. The method of claim 21 wherein the feed solution includes an aqueous solution of ferrous sulfate.

25. The method of claim 21 and further including the step of supplying carbon dioxide to the vessel.

26. The method of claim 21 wherein the pH is maintained under 3.5.

27. The method of claim 21 wherein the pH is maintained in the predetermined range through the addition of acid and base as necessary.

28. The method of claim 21 and further including the step of monitoring the pH of the contents of the vessel with a pH probe.

29. The method of claim 21 wherein the cell density is monitored using a particle size analyzer.

30. The method of claim 21 wherein the cell density is maintained in the predetermined range by controlling the supply of feed solution to the vessel.

31. The method of claim 21 and further including the step of agitating the contents of the vessel.

32. The method of claim 21 and further including the step of recirculating the contents of the vessel.

33. The method of claim 21 and further including the step of maintaining the temperature of the contents of the vessel in a predetermined range.

34. A method for generating ferric ion solution comprising the steps:
establishing in a vessel a population of acidophilic, chemoautotrophic bacteria which oxidize ferrous ions into ferric ions, wherein the bacteria are freely suspended in an aqueous solution;
supplying the bacteria with a feed solution containing ferrous ions;
maintaining the pH of the contents of the vessel in a predetermined range so that the bacteria generate ferric ions;
withdrawing a solution of the generated ferric ions from the vessel;
sustaining the viability of the population so that the population generates additional ferric ions; and
withdrawing a solution of the additional ferric ions from the vessel.

35. The method of claim 34 wherein the acidophilic, chemoautotrophic bacteria include at least one of *Leptospirillum ferrooxidans, Sulfolobus acidocaldarius, Sulfobacillus thermosulfidooxidans* and *Thiobacillus ferrooxidans*.

36. The method of claim 34 wherein the bacteria are *Thiobacillus ferrooxidans*.

37. The method of claim 34 wherein the feed solution includes an aqueous solution of ferrous sulfate.

38. The method of claim 34 and further including the step of supplying carbon dioxide to the vessel.

39. The method of claim 34 wherein the pH is maintained under 3.5.

40. The method of claim 34 wherein the pH is maintained in the predetermined range through the addition of acid and base as necessary.

41. The method of claim 34 and further including the step of monitoring the pH of the contents of the vessel with a pH probe.

42. The method of claim 34 wherein the step of sustaining the viability of the population includes supplying a growth media to the vessel.

43. The method of claim 42 wherein the feed solution includes the growth media.

44. The method of claim 34 wherein the step of sustaining the viability of the population includes maintaining the cell density of the population in a predetermined range.

45. The method of claim 44 wherein the cell density is measured using a particle size analyzer.

46. The method of claim 44 wherein the cell density is maintained in the predetermined range by controlling the supply of feed solution to the vessel.

47. The method of claim 34 and further including the step of agitating the contents of the vessel.

48. The method of claim 34 and further including the step of recirculating the contents of the vessel.

49. The method of claim 34 and further including the step of maintaining the temperature of the contents of the vessel in a predetermined range.

50. A method for maintaining a population of acidophilic, chemoautotrophic bacteria to continually generate a ferric ion solution comprising the steps:

establishing in a vessel a viable population of acidophilic, chemoautotrophic bacteria which oxidize ferrous ions into ferric ions;

supplying a feed solution to the vessel, the feed solution including ferrous ions and including media to maintain the viability of the population;

supplying carbon dioxide to the vessel;

maintaining the pH of the contents of the vessel in a predetermined range such that the bacteria generate ferric ions;

monitoring the cell density of the population of bacteria; and maintaining the cell density of the population in a predetermined range such that the population continually generates ferric ions.

51. The method of claim 50 wherein the acidophilic, chemoautotrophic bacteria include at least one of *Leptospirillum ferrooxidans, Sulfolobus acidocaldarius, Sulfobacillus thermosulfidooxidans* and *Thiobacillus ferrooxidans*.

52. The method of claim 50 wherein the bacteria are *Thiobacillus ferrooxidans*.

53. The method of claim 50 wherein the feed solution includes an aqueous solution of ferrous sulfate.

54. The method of claim 50 wherein carbon dioxide is supplied to the vessel using a sparging tube.

55. The method of claim 50 wherein the pH is maintained under 3.5.

56. The method of claim 50 wherein the pH is maintained in the predetermined range through the addition of acid and base as necessary.

57. The method of claim 50 and further including the step of monitoring the pH of the contents of the vessel with a pH probe.

58. The method of claim 50 wherein the cell density is monitored using a particle size analyzer.

59. The method of claim 50 wherein the cell density is maintained in the predetermined range by controlling the supply of feed solution to the vessel.

60. The method of claim 50 and further including the step of withdrawing ferric ions from the vessel.

61. The method of claim 50 and further including the step of agitating the contents of the vessel.

62. The method of claim 50 and further including the step of recirculating the contents of the vessel.

63. The method of claim 50 and further including the step of maintaining the temperature of the contents of the vessel in a predetermined range.

* * * * *